United States Patent [19]
Yevick

[11] 4,097,137
[45] Jun. 27, 1978

[54] MICROFICHE HAVING INTEGRAL INDEXING MEANS

[75] Inventor: George J. Yevick, Leonia, N.J.
[73] Assignee: Izon Corporation, Stamford, Conn.
[21] Appl. No.: 566,406
[22] Filed: Apr. 9, 1975
[51] Int. Cl.² ............................................. G03B 23/08
[52] U.S. Cl. ..................................... 353/120; 353/38; 353/27 R
[58] Field of Search .................. 353/27 R, 27 A, 38, 353/120; 355/53, 54; 350/167

[56] References Cited

U.S. PATENT DOCUMENTS

| | | | |
|---|---|---|---|
| 2,736,235 | 2/1956 | Toulon | 350/128 |
| 3,218,924 | 11/1965 | Miller | 350/167 |
| 3,462,219 | 8/1969 | Gumm | 355/53 |
| 3,712,724 | 1/1973 | Courtney-Pratt | 353/38 |
| 3,864,034 | 2/1975 | Yevick | 353/38 |
| 3,868,179 | 2/1975 | Zeutschel | 353/27 R |

*Primary Examiner*—Harry N. Haroian
*Attorney, Agent, or Firm*—Thomas J. Greer, Jr.

[57] ABSTRACT

An indexing construction for microfiche elements of the type wherein the microfiche is provided with integral lens elements to define a lensfiche. The improvement comprises raising the lens elements with respect to the microfiche to thereby define a plurality of upstanding positioning and indexing nodules. These nodules cooperate with complementary nodules on either a viewing screen or a harness member. By virtue of this construction both alignment of the lensfiche and indexing thereof relative to a viewing screen are facilitated.

3 Claims, 27 Drawing Figures

MICROFICHE HAVING INTEGRAL INDEXING MEANS

This invention relates to an indexing and an aligning apparatus for distributed optical information storage and retrieval system. Such a system is described in U.S. Pat. No. 3,864,034 of Feb. 4, 1975. In such systems, a microfiche is provided with integral lenses (sometimes termed lensettes because of their small size) on one face of the fiche, while a photographic emulsion is carried on its other face. Such a fiche has been termed a lensfiche because the fiche carries lenses which are integral with it. Such lensfiches may be employed to record, for example, photographically (optically store), information. After the photographic emulsion has been developed the lensfiche may be employed to project or readout the information, as by viewing on a viewing screen.

The present invention relates to a modification of the lensfiche structure such as to enable the lensfiche to cooperate with a complementary harness element to thereby accurately position a master lensfiche with a copy (slave) lensfiche. The harness and any associated system of optical projection axes may be readily fixed at a factory. Accordingly, if the lensfiche may be readily aligned with respect to the harness, then the lensfiche is perforce capable of accurate alignment with respect to these optic axes. The invention accordingly exhibits utility in several areas of application. In one, in the photographing or storage phase or use of such lensfiche elements, accurate registry between the input optic axes and the lensfiche (slave) carrying virgin emulsion is enjoyed. In another, after the virgin emulsion has been developed or fixed and optical readout is desired, accurate alignment between the microimages which are to be projected and the projection screen and/or projection light sources is made possible. In a third area of application, accurate optical registry between a master lensfiche and an unexposed lensfiche, for copying purposes, is facilitated.

In the drawings

FIG. 18a is a partial perspective view illustrating the illumination of an active lensette of the embodiment of FIG. 17.

FIG. 18b is a partially schematic plan view of the arrangement shown at FIG. 18a.

Figure 1:
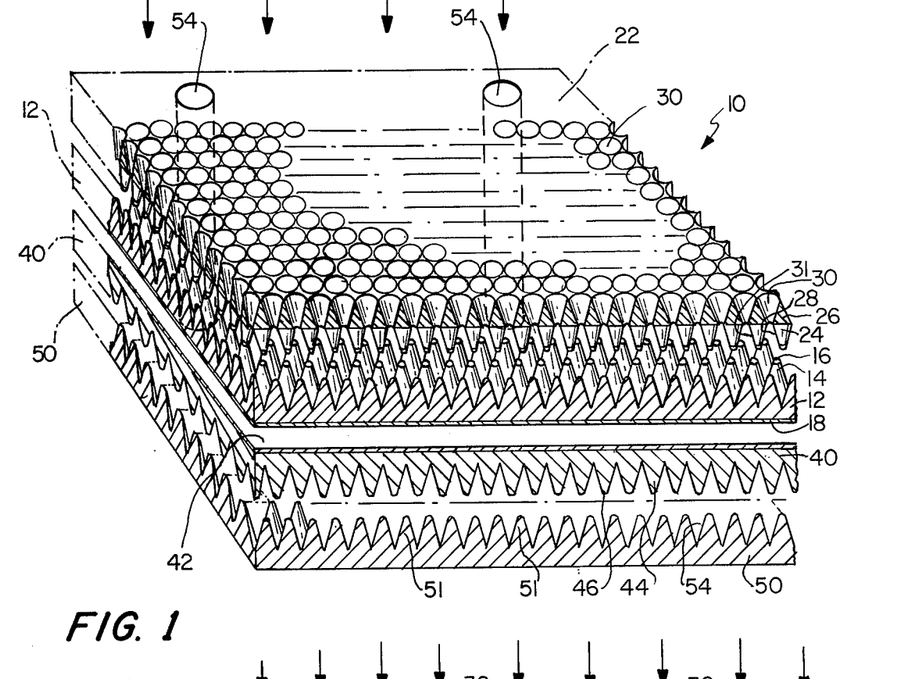
FIG. 1 is a perspective view illustrating a first embodiment of the invention and shows the relationship between a master lensfiche and its positioning harness and a slave lensfiche (having initially unexposed photographic emulsion) and the latter's positioning harness. The elements are shown as slightly separated for purposes of illustration.

Referring now to FIG. 1 of the drawings, the numeral 10 denotes generally a lensfiche-harness assembly adapted to be sandwiched together, for the purpose of making copies from a master. Once a lensfiche has been made as by exposing its virgin photographic emulsion to define thereover a plurality of unique information sets corresponding to a plurality of unique macro-scenes and then developing it, all as known in this art, it may often be desirable as in the case of publishing to duplicate the master many hundreds or even many thousands of times. In the case of very popular works of literature, such as the Bible, it may be even desired to duplicate the master millions of times. Clearly, accurate registry between the master and the copy (slave) lensfiche is required.

A typical lensfiche according to this invention is denoted by the numeral 12 and includes a regular array of upstanding conical members, synonymously, nodules, proturberances or pyramidial elements, denoted by the numeral 14. The nodules are integral with the lensfiche 12 while the tip of each nodule, denoted by the numeral 16, is curved to thereby define a lens. The master (developed) lensfiche 12 carries on its lower surface a photographic emulsion 18 which has been developed and which carries a plurality of interspersed micro images. The material of construction of such a lensfiche element is known in this art and is shown for example in my noted patent.

The numeral 22 denotes an upper harness or matrix element which may be formed of the same material of construction as lensfiche element 12, or, it may be of an opaque material. The lower surface of matrix 22 carries a plurality of downwardly extending nodules 24, generally conical in form, with the base of each adjoining the base of a similar but upwardly extending nodule 26. The inter-nodule spaces of the upper portion of harness 22 define a regular array of generally conical openings 30 which are aligned with similar downwardly extending conical openings 31 in the lower portion of the matrix.

Figure 2:
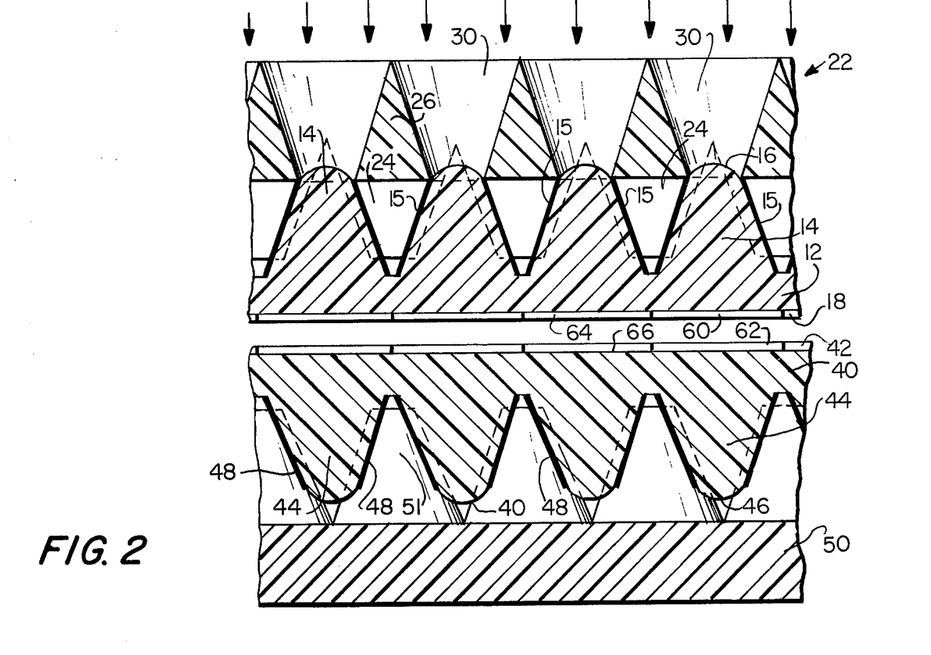
FIG. 2 is a partial transverse cross-section of the assembly of FIG. 1, with the two lensfiche elements thereof also shown as separated for purposes of illustration, while showing the lensfiche elements assembled with respect to each respective positioning harness.
Figure 3:
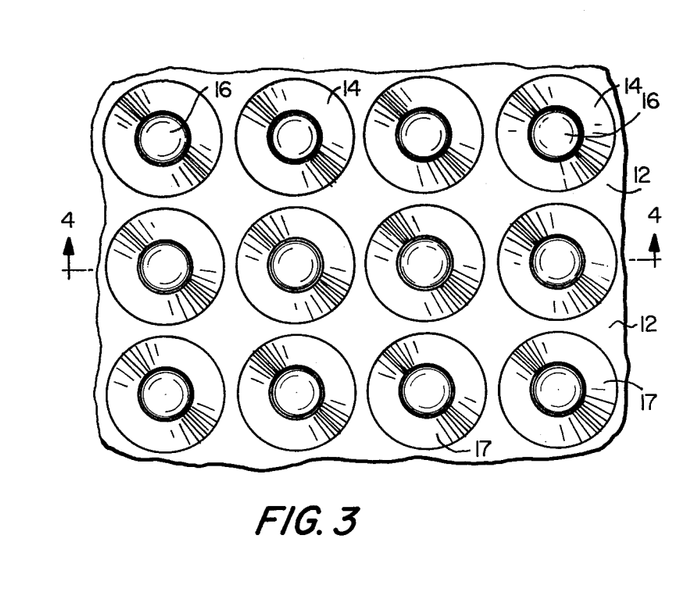
FIG. 3 is a partial plan view of the upper or master lensfiche of FIG. 1.

FIG. 2 shows the upper harness 22 in mating and abutting registry with upper lensfiche 12. The upwardly extending nodules 14 are shown as positioned within the inter-nodule spaces between the downwardly extending nodules 24 of harness 22. Each lens 16 of lensfiche 12 is thus in optical registry and alignment with a corresponding upper aperture 30 of harness 22. The upper lensfiche is thus in registry with the upper harness.

A lower lensfiche 40 which contains virgin emulsion and which is termed the slave is of a structure identical to upper lensfiche 12. Thus, lower lensfiche 40 includes downwardly extending nodules 44 having curved tip portions 46 which define lens surfaces.

Lower matrix 50 contains upstanding nodular members 51 similar to downwardly extending nodules 31 of harness 22. As shown at FIG. 2, the lower lensfiche 40 containing virgin emulsion 42 is accurately positioned with respect to lower harness 50 by virtue of the nodules 44 of lensfiche 40 fitting into the valleys or inter-nodular spaces between upstanding nodules 51 of harness 50. The manner is entirely similar to the positioning of upper lensfiche 12 with respect to the downwardly extending nodules 24 of upper harness 22. The sides of nodules 44 are coated with an opaque substance denoted by the numeral 48, similar to the opaque substance 15 on the sides of the upper extending nodules 14.

In operation, the two lensfiche elements and the two harness elements are aligned by means of positioning elements such as bolts extending through apertures 54, indicated by the dashed lines at FIG. 1. The elements are then tightly sandwiched together, the spacing between the lensfiche elements shown at FIGS. 1 and 2 being for purposes of illustration only. The top side of harness 22 is now illuminated from a suitable light source, as indicated by the downwardly extending arrows at FIGS. 1 and 2. Light enters each of the holes or cavities 30 in harness 22, passes through the lens elements 16 of lensfiche 12 and passes through the developed or fixed emulsion 18. As set out in my above-mentioned patent, the master lensfiche 12 has on its emulsion 18 interspersed information sets, two typical adjacent elements of two typical independent emulsion sets being denoted by the numerals 60 and 64. These sets are to be reproduced on virgin emulsion 42 of the slave lensfiche at areas denoted by, respectively, 62 and 66. Light passing through the emulsion at areas 60 and 64 of emulsion 18 now falls on emulsion 42. The light is, so to speak, modulated by the micro images with the result that a duplication or repliation of micro images 60 and 64 appears at areas 62 and 66, respectively. A single exposure thus serves to copy the information sets carried by emulsion 18 on master lensfiche 12. The assembly is now taken apart and lower lensfiche 40 removed for subsequent photographic development.

Figure 6:
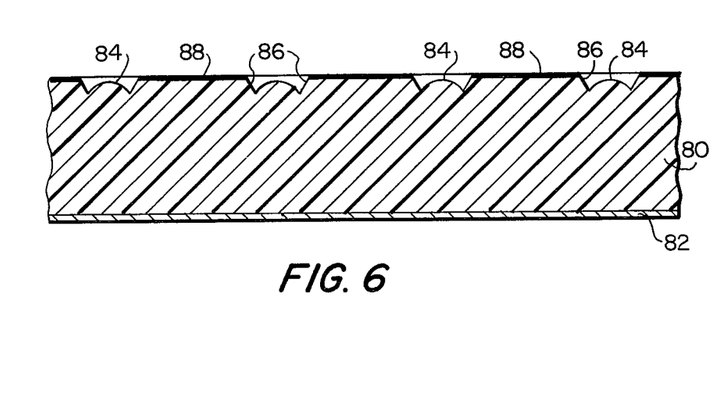
FIG. 6 is a transverse view of the embodiment of FIG. 5 taken along section 6—6 thereof.
Figure 7:
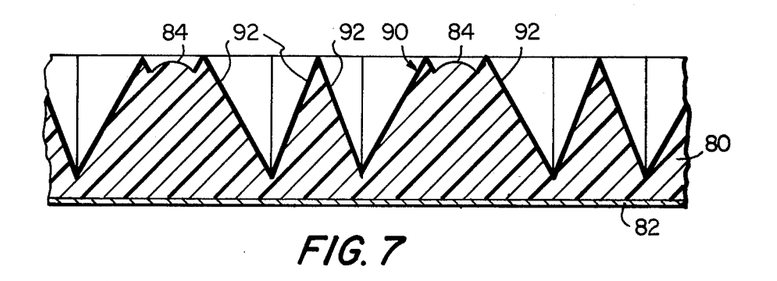
FIG. 7 is a view taken along section 7—7 of FIG. 5.
Figure 8:
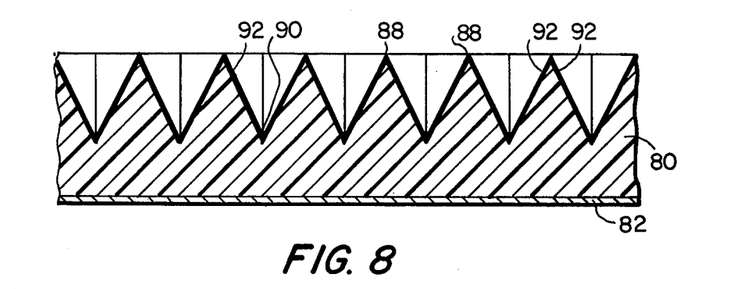
FIG. 8 is a view taken along section 8—8 of FIG. 5.

FIGS. 5-10 inclusive illustrate another embodiment of the invention. As shown most clearly at FIGS. 5-8 of the drawings, the lensfiche 80 of this embodiment is similar to the lensfiche elements 12 and 40 of the previously described embodiment. Instead, however, being provided with upstanding generally conical nodules, the lensfiche 80, having photographic emulsion 82 on its lower face, is provided on its top surface with a plurality of lens elements or lensette 84. As indicated at FIG. 6, the lens elements are submerged or depressed from the top level of the lensfiche 80 to thereby protect them from scratching and abrasion. The upper surface of lensfiche 80 is defined by a plurality of depressions each in the general form of a tetrahedron. Ridges 88 are the highest points of tetrahedron planes 92 which also intersect at valley portions 90. Regions 86 which surround each lensette element 84 are coated with an opaque substance. In a similar manner, planes 92 are also coated with an opaque substance. A consideration of FIG. 5, along with sectional views of FIGS. 6-8, will make plain the structure of the lensfiche.

Figure 9:
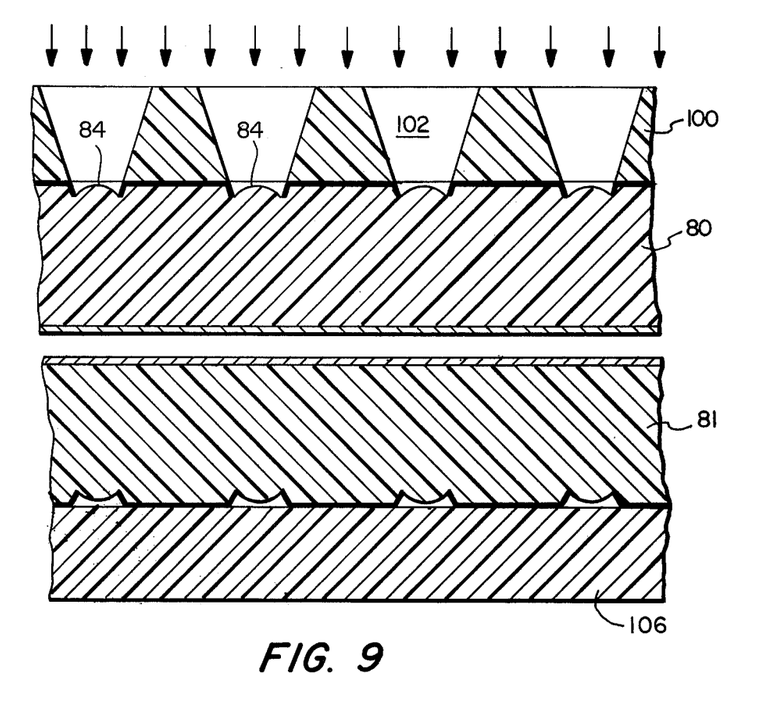
FIG. 9 is a view similar to FIG. 2, showing two lensfiche elements of FIG. 6 in conjunction with harness elements.
Figure 10:
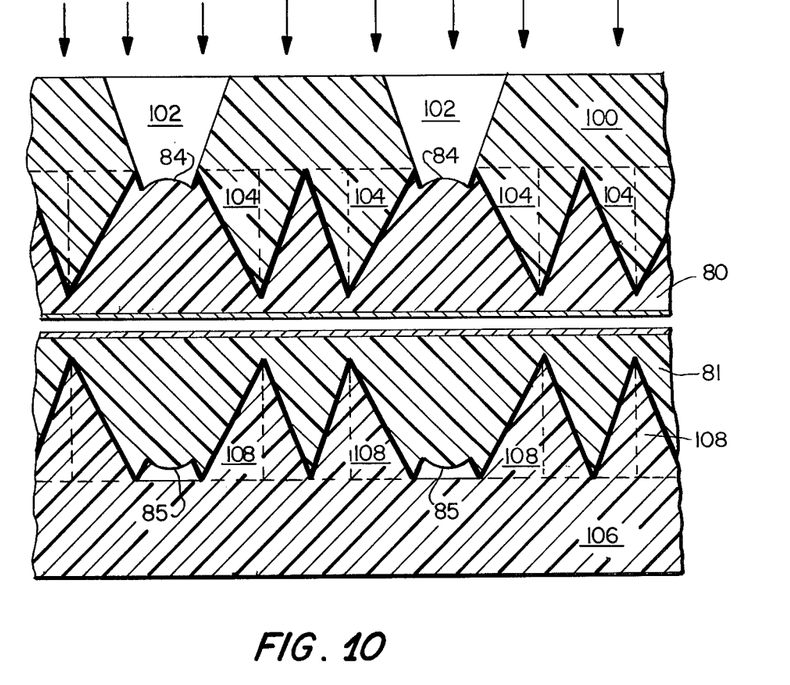
FIG. 10 is a view similar to FIG. 2, showing two lensfiche elements of FIG. 7 in conjunction with harness elements.

In operation an upper, master lensfiche 80 is positioned relative to a harness 100 (similar to harness 22) while lower harness 106 (similar to harness 50) positions lower slave lensfiche 81. The two harnesses cooperate in an identical manner as shown in FIG. 1 to position the master and slave lensfiche elements. FIG. 9 is a cross-section of the completed assembly (shown slightly separated for purposes of illustration) and corresponds to the cross-section of FIG. 6. FIG. 10 is a view which corresponds for the cross-section of FIG. 7. As shown at FIG. 10 upper harness 100 includes apertures 102 and downwardly extending positioning nodules 104 which fit into depressions defined by tetrahedron planes 92. Lower lensfiche 81 which contains lensette elements 85 is thus positioned so that these lensettes are directly beneath corresponding lensettes 84 of the upper lensfiche.

The mode of operation is identical with that previously described in connection with the embodiment of FIG. 1. Namely, considering either FIGS. 9 or 10, master lensfiche 80 is in touching relation with lower lensfiche 81, the two elements having been brought together by the two harness structures by means of heavy glass plate under pressure or by any standard procedure using vacuum. Such procedures are well known in the photographic art. Light from a suitable source is directed on the top of upper harness 100 and passes through its apertures 102 (corresponding to openings 30 of FIG. 1) with the result that the emulsion micro images associated with each upper lensette 84 are projected onto the emulsion portions of the lower lensfiche which are associated with each lensette 85. After a single exposure, the harness elements are separated and the lower lensette emulsion photographically developed.

Figure 11:
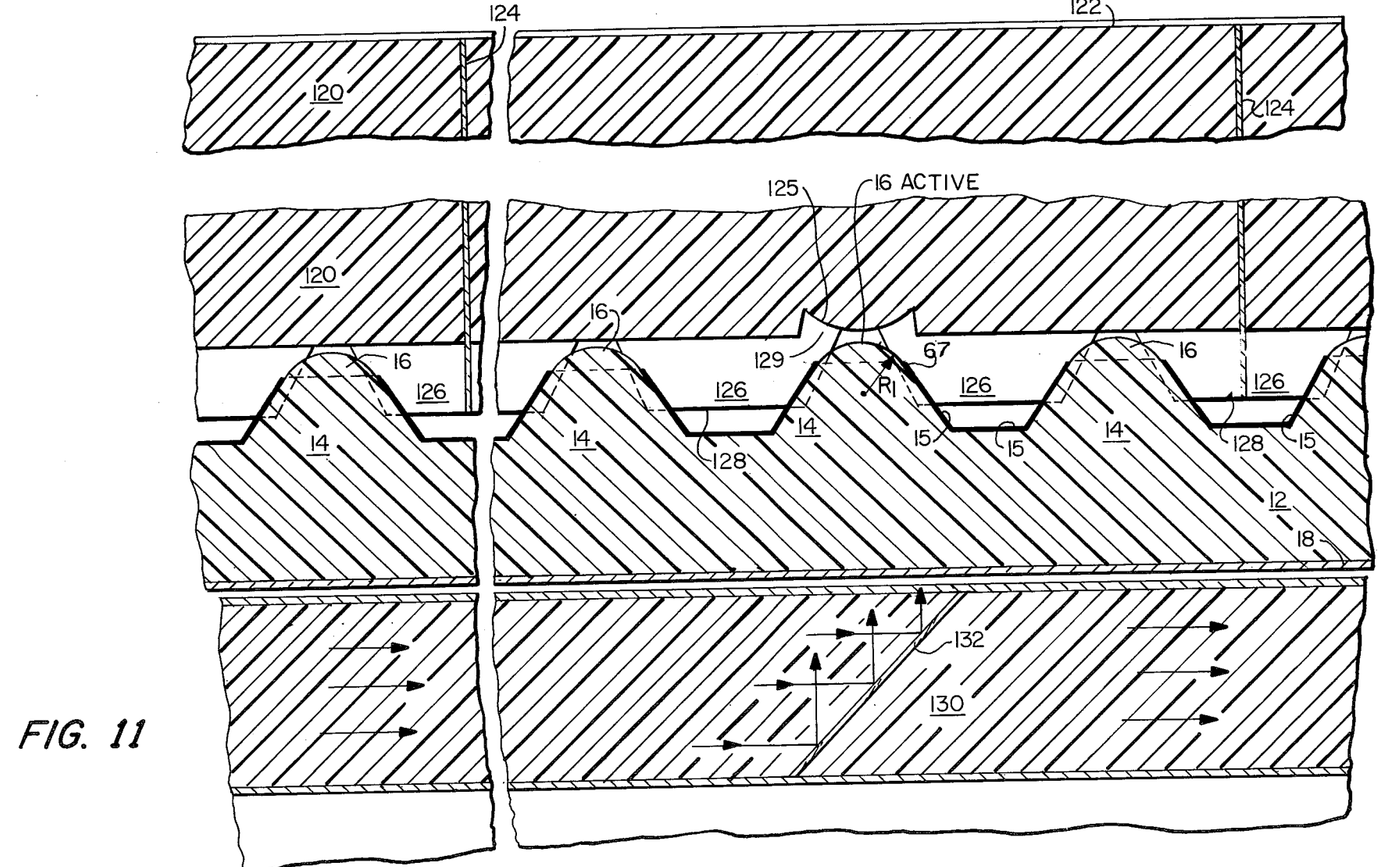
FIG. 11 is a partial transverse cross-sectional view illustrating an embodiment of the invention as applied in the viewing or readout stage.

Referring now to FIG. 11 of the drawings, a partly schematic cross-sectional view illustrates how a lensfiche embodying the structural features according to this invention is employed in conjunction with a viewing screen. Numeral 12 denotes a lensfiche identical to that illustrated with respect to the first-described embodiment. The numeral 120 denotes a viewing screen of a transparent substance having a viewing surface 122 and a plurality of opaque septa 124. Septa 124 are entirely similar in structure and function to that denoted by the numeral 60 at FIG. 5 of my U.S. Pat. No. 3,864,034. The lower portion of viewing screen 120 is provided with downwardly extending positioning nodules 126, such nodules being similar in structure and function to nodules 31 of upper harness 22 of the embodiment of FIG. 1. Opaque coating 128 is distributed over the entire bottom surface of viewing screen 120, except at those portions which receive an active lensette of the lensfiche. This opaque coating is similar in function to opaque coating 56 shown at FIGS. 5–7 of my U.S. Pat. No. 3,864,034, with openings 129 being analogous to openings 58 of that patent. If desired, the lower surface of the viewing screen 120 may include a curved surface 125 at each maks opening 129 and in optical alignment with the active lensette 16. Surface 125 yields additional optical power and abberation correction.

The numeral 130 denotes generally an illuminating sheet or assembly such as that described with respect to FIGS. 14 and 15 of my noted patent and may be identical to an illuminating sheet constructed according to the practice of the invention shown and described in co-pending application Ser. No. 536,409 by Lawrence W. Grunberger, filed Dec. 26, 1974, hereby incorporated by reference. Only one internal reflector of the many used in practice, namely, reflector 132, is illustrated.

The operation of the assembly illustrated at FIG. 11 is as follows. Emulsion 18 of lensfiche 12 is assumed to have already been developed to define a plurality of distinct information sets, such as described in my U.S. Pat. No. 3,864,034. Light from a source of illumination is passed from the left to the right in FIG. 11, along light conducting sheet 130, until it strikes one reflecting surface 132. Here, it is reflected upwardly to active lensette 16, passing through aperture 129 in opaque coating 128 and then upwardly to the upper surface 122 of viewing screen 120. The septa 124 control the extent of the field of view to inhibit optical cross-talk, while the opaque coating 128 ensures that only the images from the micro image which is associated with the active lensette (in opening 129) appears on the viewing screen. After one scene is viewed and it is desired to view another scene, lensfiche 12 is indexed with respect to its viewing screen to thereby align a different set of information sets with openings 129 (only one opening 129 having been illustrated) in opaque coating 128. The reader will realize that openings 129 are entirely analogous to the openings 86, 88, 90, 92 of FIG. 15 of my noted patent. Such indexing is accomplished in the following manner. The lensfiche 12 is moved with respect to viewing screen 120 from one detent position to the next so that the upstanding nodules 14 of the lensfiche pass through the valleys (saddle points) between positioning nodules 126 of the viewing screen. Thus the detenting or indexing scheme is built-in between the viewing screen and the lensfiche.

Figure 12:
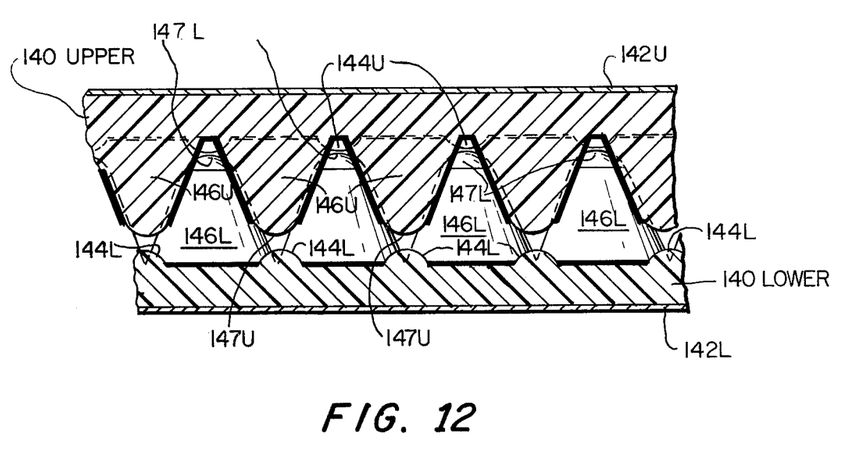
FIG. 12 is a partial cross-sectional view showing two lensfiche elements according to this invention in mating engagement for yielding two different stages or kinds of magnification.
Figure 13:
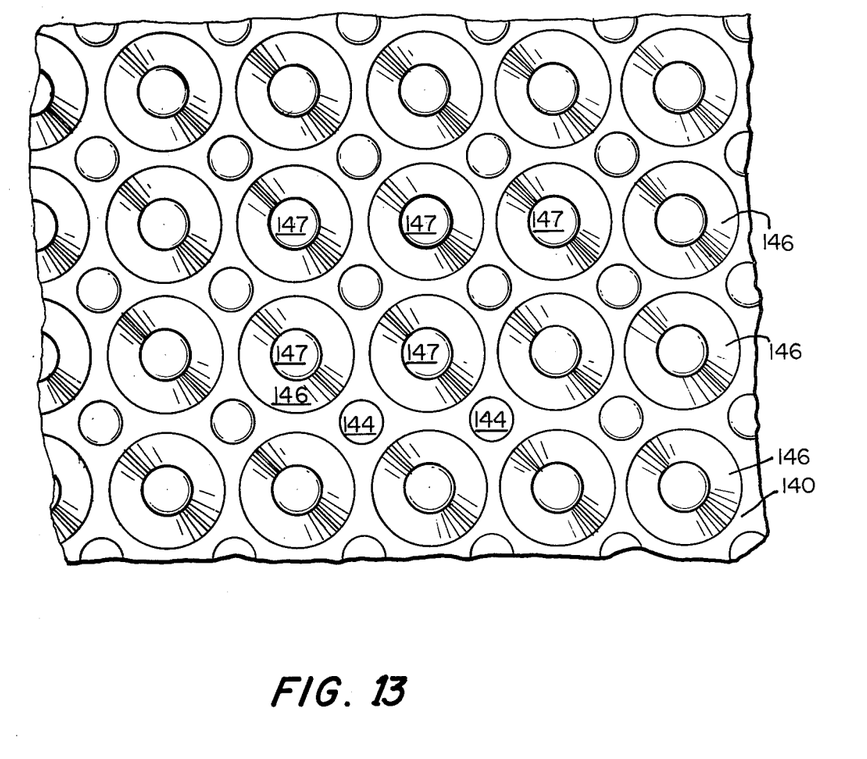
FIG. 13 is a partial plan view of the lower lensfiche 140 of FIG. 12.
Figure 14:
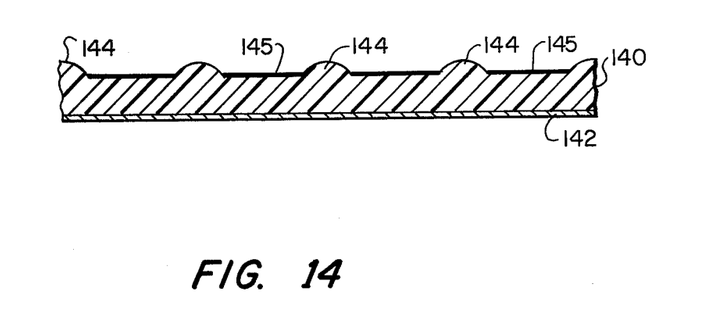
FIG. 14 is a cross-sectional view taken along section 14—14 of FIG. 13.

Referring now to FIGS. 12–14, an embodiment is illustrated wherein two lensfiche elements may be employed to yield different magnifications. Each lensfiche is formed as in the manner previously illustrated, namely, referring now to FIG. 13 in particular, one face of the lensfiche has a plurality of main, upstanding conical, nodule members 146 whose curved tips define lens elements 147. These conical elements are arranged for example in rows and columns. Intermediate, smaller nodules 144 are positioned as indicated at FIG. 13 between the main upstanding members 146, with members 144 also defining lenses. An opaque, inter-lens coating is denoted by the numeral 145. Two such lensfiche elements are positioned as indicated at FIG. 12, namely, with the conical elements 146 of one lensfiche optically aligned and with the smaller lens element 144 on the bottom lensfiche. The larger conical elements on the bottom lensfiche are in corresponding vertical and optical alignment with the smaller lens elements on the top lensfiche. Referring now to FIG. 12, a typical assembly of this embodiment is illustrated, with the upper lensfiche 140 carrying the designation U (for upper) after the numerals for its elements, and the lower lensfiche 140 carrying the designation L (for lower) after its corresponding elements. Thus, lens element 144 L is in optical alignment with upper lens element 147 U while lower lens element 147 L on the larger, conical nodules is in optical and vertical alignment with upper, smaller lens element 144 U. The upper emulsion is designated as 142 U while the lower emulsion is designated 142 L. In a manner entirely analogous to the embodiment illustrated at FIG. 1, the upper lensfiche and emulsion may be regarded as the master, while the lower lensfiche and emulsion regarded as the slave or copy which is to be made and which carries virgin emulsion.

With this background, the reader will now be in a position to comprehend the operation of this embodiment. If one magnification is desired, the master lensfiche is made so that the micro images on emulsion 142 U are in optical alignment with smaller lens elements 144 U. Light is passed through these micro images, through lens element 144 U, to lens element 144 L, and thence to emulsion 142 L immediately therebeneath.

If a second, different magnification is required, the master lensfiche 140 Upper is formed so that it carries micro images in optical alignment with the larger, conical nodules 146 U. Light from above passing downwardly then passes through these micro images, through curved lens surfaces 147 U, through lens surfaces 144 L, and thence onto virgin emulsion 142 L. Regarding the micro images in master emulsion 142 U as objects, and considering the virgin emulsion 142 L as a viewing screen, it will readily be comprehended that, depending upon which sets of lens elements are employed, the size of the final micro images on emulsion 142 L will vary.

Figure 15:
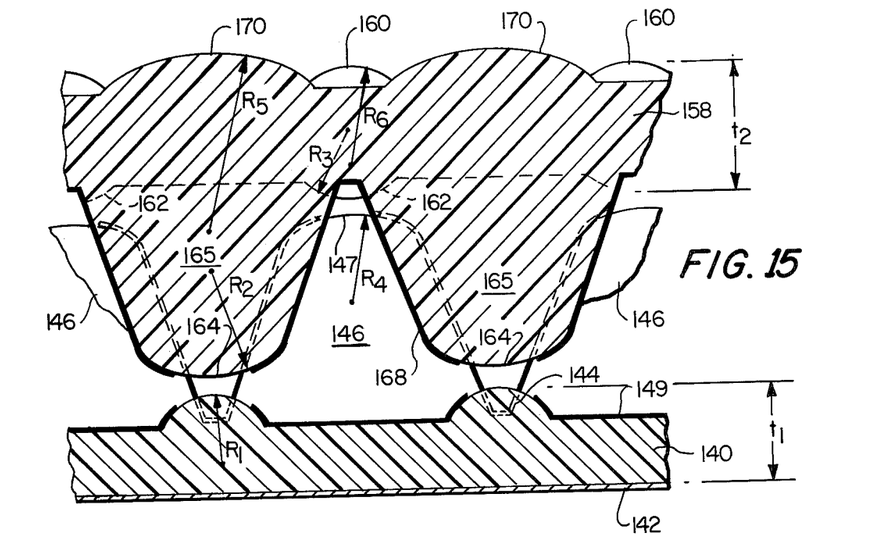
FIG. 15 is a view similar to FIG. 12 and showing a modification thereof.

Referring now to FIG. 15 of the drawings, a variation of the embodiment just described is illustrated. A number of possibilities prevail for variation of the optical performance, such as magnification of a lensfiche. As illustrated at FIG. 15, the various radii $R_1$–$R_6$ may be varied as well as the index of refraction of the lower lensfiche 140, having index $n_2$, to thereby provide a wide variety of optical systems. In the embodiment of FIG. 15, only the bottom lensfiche structure carries an emulsion 142 although it is possible in certain applications that both the top and bottom lensfiche elements will carry intelligence. The numeral 158 denotes an upper lensfiche, similar to lensfiche 140 Upper of FIG. 12, the upper lensfiche 158 having lens elements 164 at the tips of larger, conical nodules 165. Upper lensfiche 158 may also include lens surfaces 160 and 162 which correspond to lens surfaces 144 of the lower lensfiche. Additionally, curved lens surfaces 170 may be provided in optical alignment with each lens surface 164. Lens surfaces 160 and 162 of lensfiche 158 are in optical alignment with lens surface 147 of each upstanding conical member 146 of lower lensfiche 140. Similarly, lens elements 144 are in optical alignment with lens elements 164 and 170. Thus, surfaces $R_1$, $R_2$ and $R_5$ may define one optical system, so to speak, while curved surfaces $R_3$, $R_4$ and $R_6$ define another optical system. The possibility of utilizing both surfaces may be readily understood by coating the bottom surface with intelligence of one color and the top surface of another color, so that there will be no interference between the two surfaces.

Figure 16:
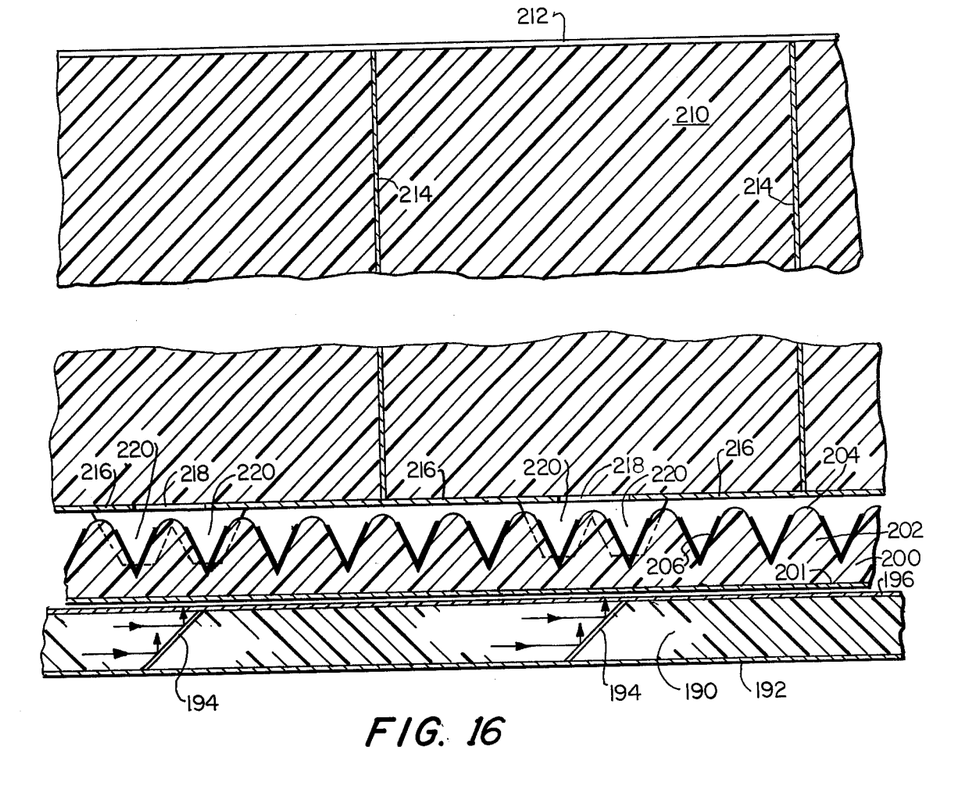
FIG. 16 is a partial cross-sectional view, similar to FIG. 11, showing a modification thereof wherein a smaller number of positioning nodules on the viewing screen is employed.

Referring now to FIG. 16, another embodiment is illustrated and is similar to that of FIG. 11. The numeral 190 illustrates a lighting sheet such as that disclosed in the noted Grunberger application and includes a lower transparent coating 192, internal mirrors 194 and an upper transparent coating 196. Light fed in from the left, as indicated, is reflected upwardly from mirrored surfaces 194. The mirrored surfaces 194 occupy positions at the corners of imaginary squares and correspond in position to the active lensettes of lensfiche element 200. Lensfiche 200 is provided with emulsion 201 which carries developed microimages. It also carries integral conical positioning nodules 202, the tips of which carry curved lens surfaces 204. Opaque coating 206 covers all of the conical members 202 except for exposed tips 204. The reader will understand that upstanding conical members 202 are in, for example, a rectangular array entirely spread over the upper surface of lensfiche 200.

The numerial 210 denotes a viewing screen which may be formed, for example, of a suitable plastic similar to that employed for lensfiche 200 and light sheet 190, namely, methylmethacrylate, and has an upper viewing surface 212. It carries opaque septa 214. The lower surface of viewing screen 210 carries opaque coating 216 uniformly dispersed over the bottom surface of the viewing screen, except for mask openings 218. Each mask opening 218 is optically aligned with an active lensette, namely, whatever lensette is immediately therebeneath and in optical alignment therewith. The viewing screen is provided with a plurality of downwardly extending conical positioning members 220 which surround the active lensette adjacent each mask opening 218. The downwardly extending conical elements 220 thus function, in a manner entirely analogous to that previously explained, to index the lensfiche accurately with respect to each mask opening 218. To effect indexing, it is only necessary to move the lensfiche 200 laterally so that the lensfiche moves with its upstanding conical members 202 between the valleys (saddle points) of the downwardly extending positioning conical members 220. This will entail a slight vertical movement of the entire lensfiche 200 upon such movement.

Figure 17:
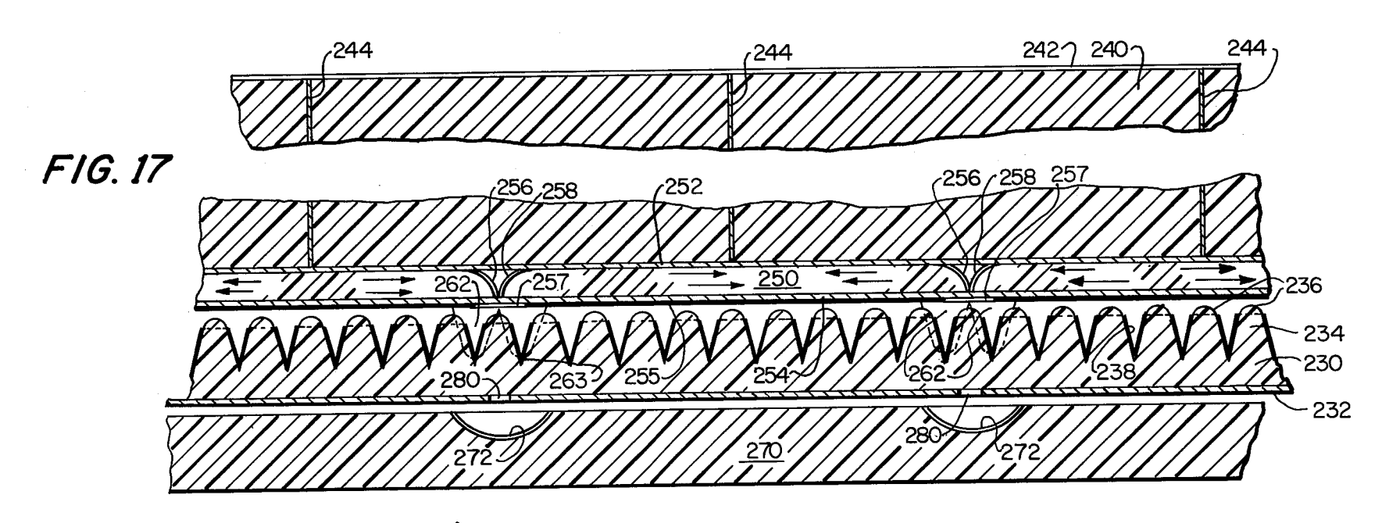
FIG. 17 is a partial cross-sectional view, similar to that of FIG. 16, showing a modification wherein more accurate and positive alignment may be realized between the illuminating sources of light and the active lensettes.
Figures 18A, 18B:
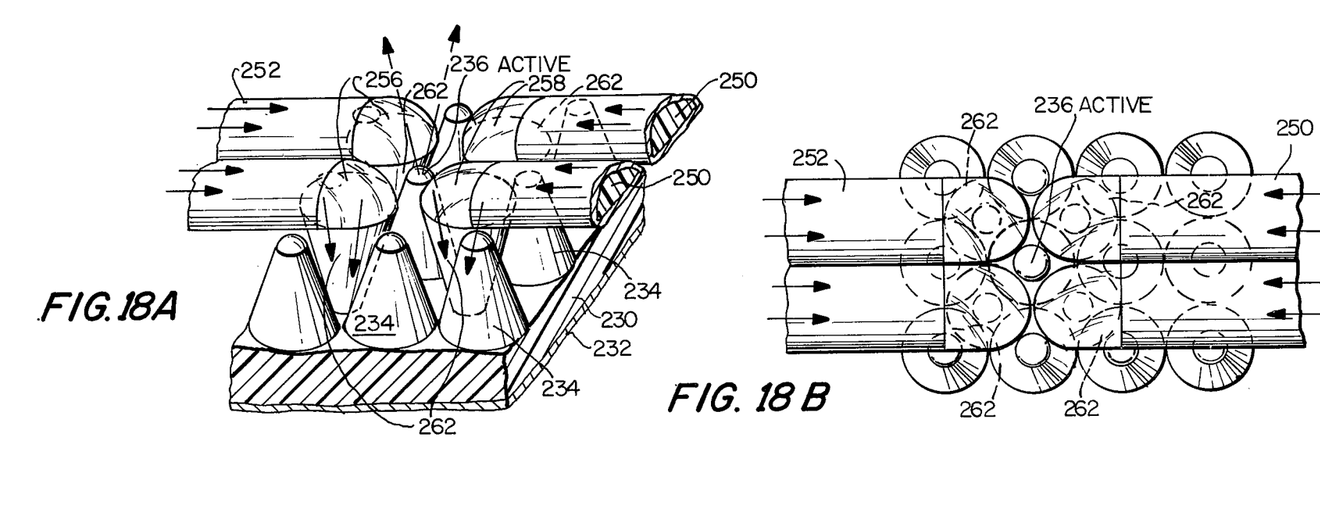

Referring now to FIGS. 17, 18a and 18b, another embodiment is illustrated which will assure proper alignment not only of the lensfiche relative to the mask openings in the bottom of the viewing screen, but also accurate alignment between the light sources and the microimages carried by the lensfiche. The numerical 230 denotes a lensfiche of the type previously described having a developed photographic emulsion 232 on its bottom surface. The lensfiche is provided on its upper surface with a rectangular array of upstanding conical members 234 having curved tips 236 which each define a lens. Opaque coating 238 extends around the sides of the cones. The numeral 240 denotes a viewing screen having a viewing surface 242 and formed of the same material as previously described. The viewing screen also includes a plurality of opaque septa 244 whose function, again, is to inhibit optical cross-talk. The numeral 250 denotes a light-conducting sheet, similar to that described either in the above-mentioned Grunberger application or my noted patent, which is coated on its top with coating 252 and on its bottom with coating 254 of a transparent material of lower index of refraction, so that the sheet will be totally internally reflecting. The lower portion of the viewing screen 240 is also provided with an opaque coating 255 which is continuous except for openings 257 which may be regarded as mask openings, entirely analogous to mask openings 218 of the embodiment of FIG. 16. Four downwardly extending conical members 262 are integral with viewing screen 240 adjacent each mask opening 257. These conical elements are entirely analogous in structure and its function to elements 220 of the embodiment of FIG. 16. Curved reflecting surfaces 256, 258 are also provided immediately adjacent openings 257.

Plate member 270 is positioned beneath the lensfiche 230 and includes recessed reflecting surfaces 272. The surfaces may be planar if desired, as will be more readily apparent from the following description.

FIG. 18a illustrates the relationship between the reflecting surfaces of 256, 258, the downwardly extending positioning elements 262, and the latter's indexing relation with upwardly extending conical elements 234 of lensfiche 230. In operation, light passes from the right and from the left in transparent sheet and strikes reflecting surfaces 256, 258, there being four such surfaces altogether, as indicated at FIG. 18a. The light reflected downwardly from these reflecting surfaces passes through conical members 262, through the lensfiche and onto reflecting surfaces 272 of plate 270. It is reflected upwardly through the microimages denoted by the numeral 280 on emulsion 232 and thence through upwardly extending active lensette 234 onto viewing surface 242. In FIGS. 18a and 18b, the designation "Active" has been given to indicate that when an upwardly extending conical member 234 is within the quartet of downwardly extending members 262 adjacent a mask opening 257, it then becomes that lensette which projects light upwardly for viewing on the screen.

In order to index the lensfiche, the same procedure is employed with respect to the embodiment of FIG. 16, namely, the lensfiche is moved laterally in valley-to-valley relationship so that successive sub-sets of conical member 234, corresponding to distinct informaton sets, become the active lensettes for a particular macro scenes.

The above arrangement compensates for environmental fluctuations of temperature, humidity, or the like, which might otherwise change the desired alignment between the sources of illumination and the various sets of microimages on the emulsion. Thus, although there may be slight changes due to temperture or humidity even from active lensette to an adjacent active lensette, there can be no large, cumulative changes over the entire lensfiche surface. This is because local congruence between the cative lensette and its corresponding mask opening in the projection screen is insured by virtue of this construction.

Figures 19, 20, 21:
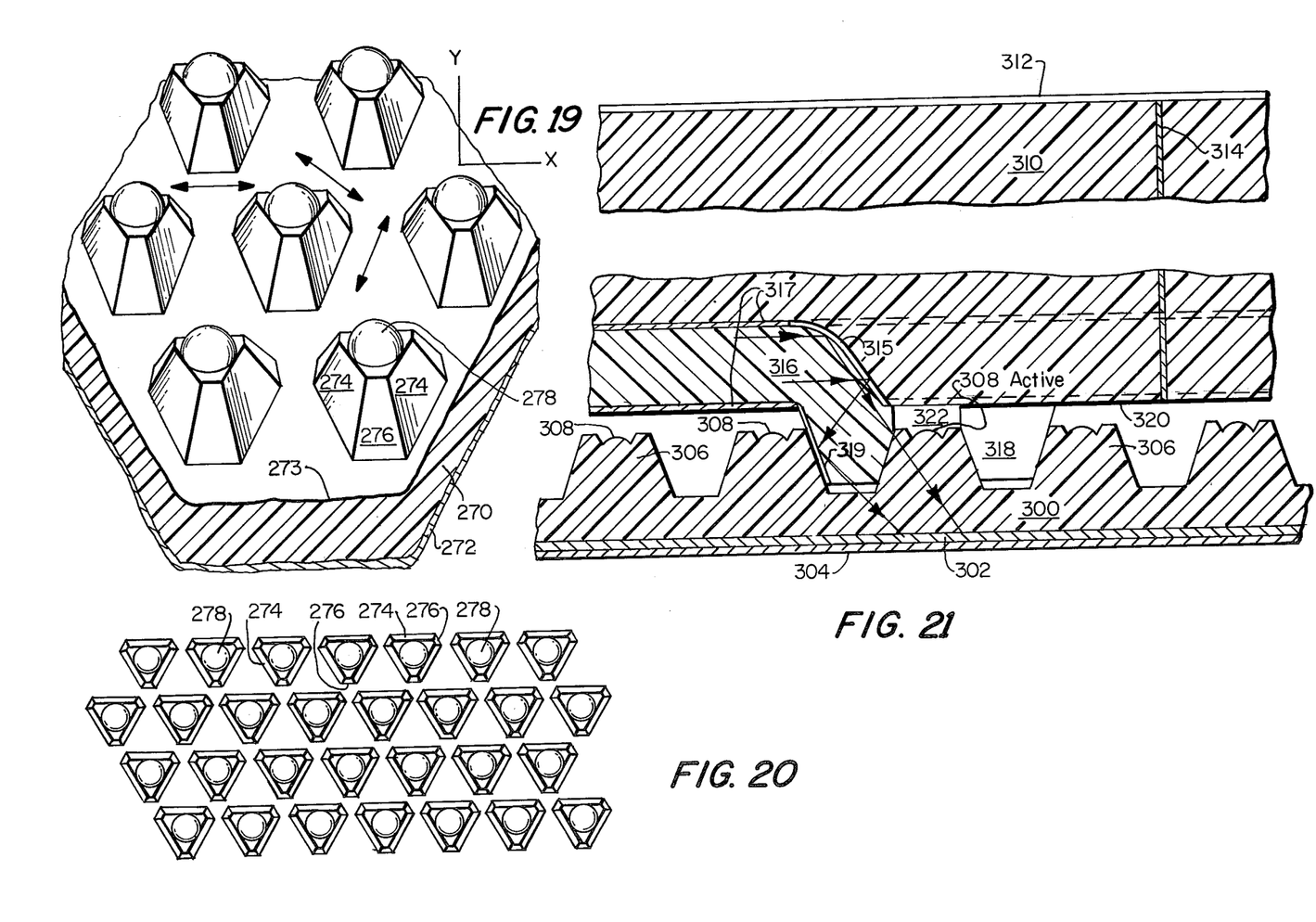
FIG. 19 is a partial view in perspective of a lensfiche having pyramidial, upstanding integral nodules.
FIG. 20 is a partially schematic plan view illustrating the arrangement of the upstanding pyramidial elements of FIG. 19.
FIG. 21 is a view similar to FIG. 16 and illustrates a modification of the invention as used in the readout stage.

Referring now to FIGS. 19 and 20, another modification is illustrated where in lieu of upstanding conical members integral with the lensfiche, upstanding pyramidal nodules are employed. The numeral 270 denotes a lensfiche of a transparent plastic such as polymethylmethyacrylate and which is provided on its lowest face with a photographic emulsion 272. Integral, upstanding pyramidal members are defined by three main, flat faces each denoted by the numeral 274 and three smaller faces each denoted by the numeral 276. The top of each pyramidal member carries a lensette 278. The geometrical arrangement is also shown at FIG. 20 wherein the hexagonal array is more easily seen. As indicated by the large double-headed arrows, indexing may take place along the X axis as well as 60° and 120° with respect to the X axis. The sides 276 may be paired off so that, in essence, a detent mechanism exists in displacing the lensfiche of FIG. 19 when it is nestled between corresponding mating pyramidal detents carried by the screen. Except for the lensettes 278, the entire upper surface of lensfiche 270, including the pyramidal sides, may be coated by opaque substance 273.

Figure 22:
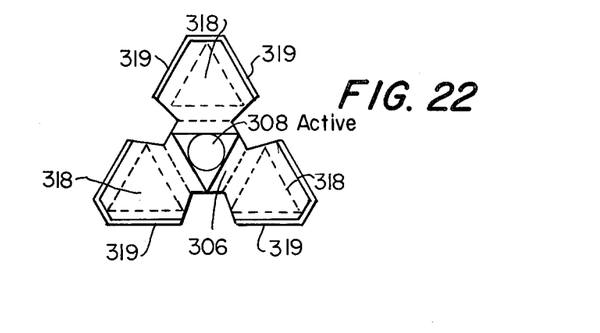
FIG. 22 is a partial plan view showing the relationship between three adjacent illuminating and positioning nodules of the screen of FIG. 21 to an active lensette of the lensfiche of FIG. 21.

Referring now to FIGS. 21 and 22 of the drawings, a mode of illumination and cooperation with a viewing screen for an embodiment similar to that of FIG. 19 is illustrated. The reader will immediately recognize the similarity between the construction of FIG. 21 and that previously given with respect to FIG. 17. The numeral 300 designates a lensfiche of a transparent material and which carries on its lower surface developed photographic emulsion 302. Mirrored surface 304 coats the emulsion, such that light coming down from the lensfiche will pass through the emulsion, strike the surface 304, and then be reflected back up into the emulsion and lensfiche material. The lensfiche is provided with integral, upstanding pyramidal nodules 306, similar to those shown at FIG. 19. In distinction to that construction, the lensettes 308 associated with nodules 306 are depressed below the top surface of the pyramidal members to thereby inhibit scratching thereof. The numeral 310 denotes a viewing screen having a viewing surface 312 and opaque septa 314 similar to that already known in the art.

Reflecting surface 315 is associated with light conducting sheet 316, the latter internally reflecting by virtue of coatings of 317 on both sides thereof. Positioning (pyramidal) nodules 318, integral with the viewing screen, extend between the upstanding pyramidal members 306 of the lensfiche to align these two members, in a manner entirely analogous to that already described with respect to the embodiment of FIG. 17. The bottom surface of viewing screen 310 carries an opaque coating 320, thus defining an opaque mask with spaced openings 322 for each active lensette 308. In operation, for a single macro scene, each area immediately beneath an active lensette 308 is illuminated in the following manner. Light passes along the light conducting sheet 316, a portion being reflected at surface 315 down into one of the pyramidal members 318, thence down into upstanding member 306 and onto emulsion 302 carrying the microimage to be projected. A portion of this light is reflected upwardly through active lensette 308 to viewing surface 312. Another portion of the light in sheet 316 is reflected first at surface 315 and thence at mirrored surface 319 of pyramidal member 318 and also onto the microimage carried by emulsion 302 and thence upward through active lensette 308 to viewing surface 312.

FIG. 22 further indicates the relationship between the active lensette 308 and the three contiguous, positioning pyramidal elements 318. Upstanding pyramidal element 306 which carries active lensette 308 is shown as engaged on three of its main, planar surfaces by the positioning elements 318. Each of the latter is provided over a major portion of its surface with silvered or reflecting coating 319 which functions, as above described, in cooperation with reflecting surface 315 of light conducting sheet 316.

Figure 23:
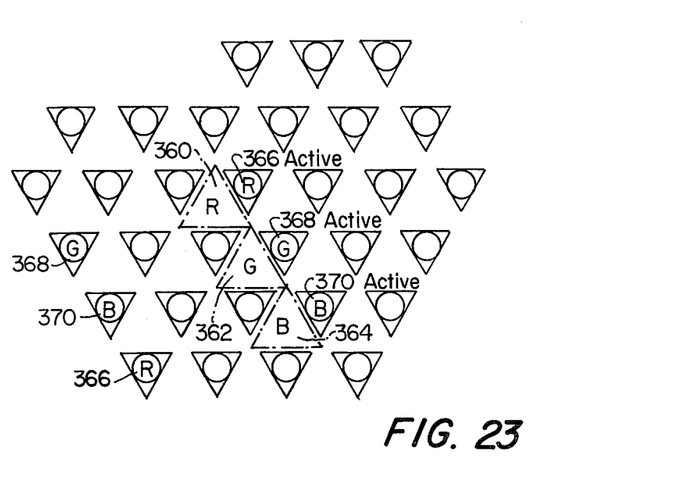
FIGS. 23 and 24 are partially schematic plan views and illustrate an arrangement for use in a structure such as shown at FIG. 21 for reading out color information with the use of black and white emulsion on a lensfiche.
Figure 24:
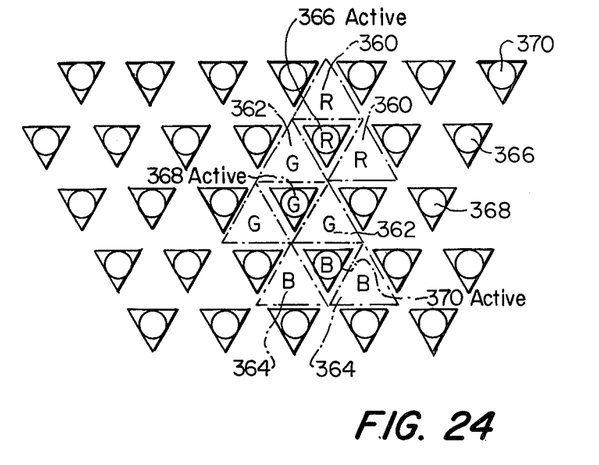

Referring now to FIGS. 23 and 24, a partially schematic indication is given of the utilization of the structures of this invention for obtaining color readout as well as color recording. As illustrated in my U.S. Pat. No. 3,824,609, it is possible to enjoy color recording and color projection by the use of black and white photographic emulsion, by the provision of color filters associated or coated on adjacent lensettes. At FIG. 23 an extension of the illumination system of FIG. 21 is illustrated wherein three color filters 360, 362 and 364 being for example red, green and blue, are shown as servicing three lensfiche lensettes 366, 368 and 370, respectively. Each color filter 360, 362, 364 is associated with a correspsonding positioning nodule, such as nodule 318 of the embodiment of FIG. 21. A positioning nodule is provided with a red color filter 360 so that light passing through it, in a manner analogous to that shown at FIG. 21, illuminates lensette 366 (associated with an upstanding pyramidial nodule such as 306 of FIG. 21) with red light. Adjacent downwardly extending positioning nodule which carries green filter 362 supplies green light to lensette 368, while filter 364 associated with an adjacent downwardly extending positioning nodule supplies blue light to lensette 370. In distinction to providing color filters 360, 362, 364 on the downwardly extending, positioning nodules, lensettes 366, 368 and 370 may themselves be colored or coated with a suitable dye or filter. As in the embodiment of FIG. 21, the bottom of the emulsion associated with the lensfiche is silvered to function as a mirror.

FIG. 24 illustrates a similar lighting arrangement for enjoying both color recording and projection or readout or the use of black and white film, analogous to that previously described. The essential difference between the system indicated at FIG. 24 and that previously described with respect to FIG. 23 is that three color filters each associated with a respective positioning nodule service the green active lensette 368, while only two such color filters service, respectively, the active red lensette 366 and the active blue lensette 370. This is because green is the most sensitive color for the human eye.

Figure 25:
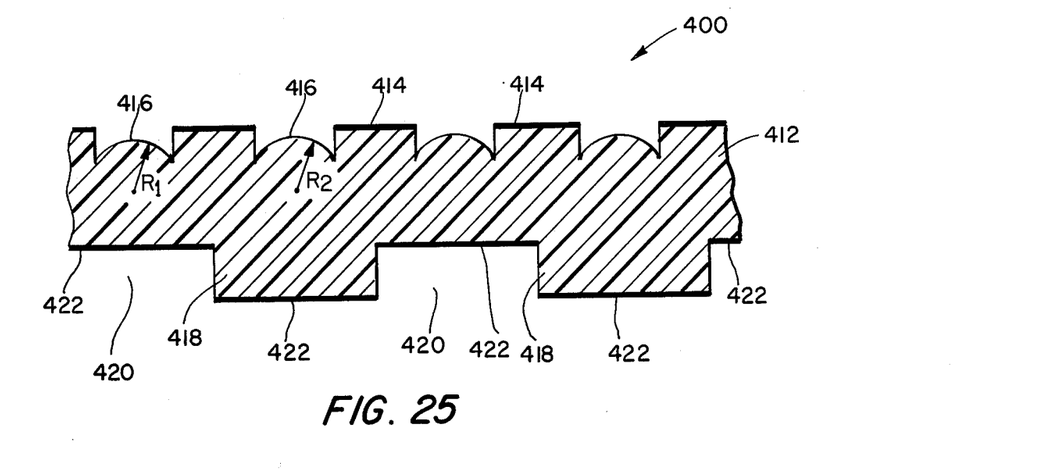
FIG. 25 is a view similar to FIG. 4 and illustrates an embodiment.
Figure 26:
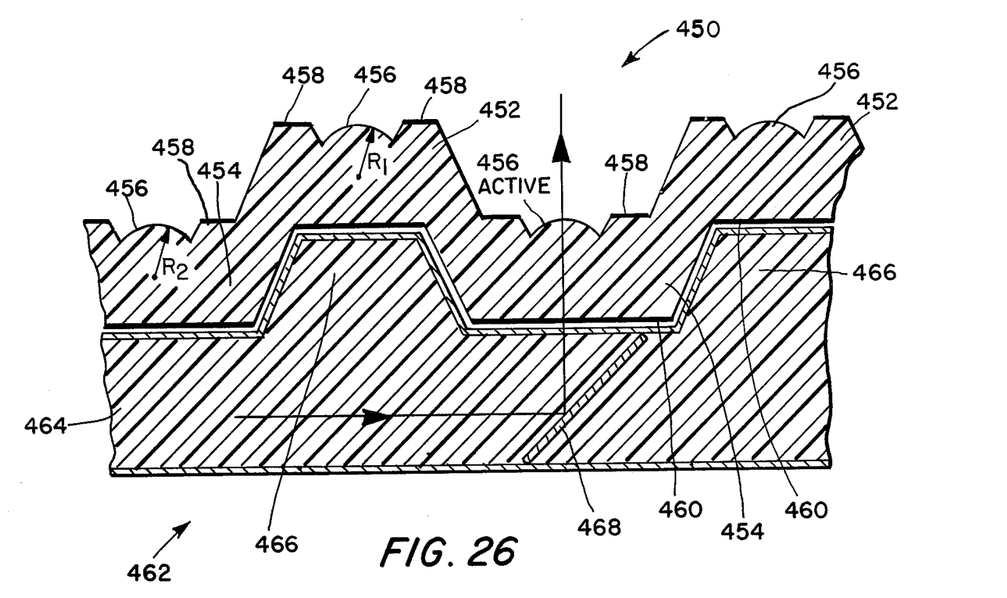
FIG. 26 is a view similar to FIG. 25 and shows an additional modification wherein the top or upper portion of the lensfiche which carries the lensettes is also stepped so as to define a plurality of nodules and valleys.

Referring now to FIGS. 25 and 26 of the drawings, two embodiments are shown illustrating still another lensfiche cross-sectional configuration. The lensfiche is generally similar to that illustrated at FIG. 4 of the drawings. The reader will recall, with reference to FIG. 17, a structure wherein the lighting sources for the microimages are fixed each indexing operation with respect to complementary valleys or recesses in the lensfiche itself. This inhibits relative motion between the illumination sources and the microimages which are to be projected and assures proper alignment therebetween. While the structure of FIG. 17 is suitable for applications wherein the illumination is from above, it may sometimes be desirable to illuminate the lensfiche from below. In those latter instances, it is also desirable to accurately align, lock in, or position the illumination sources with respect to the microimages.

Figure 4:
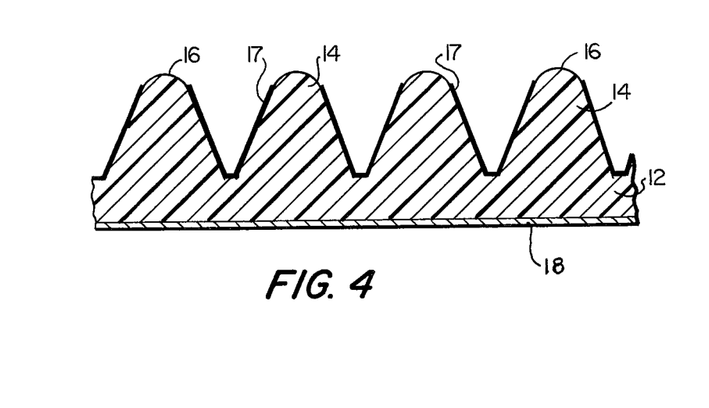
FIG. 4 is a view taken along section 4—4 of FIG. 3.
Figure 5:
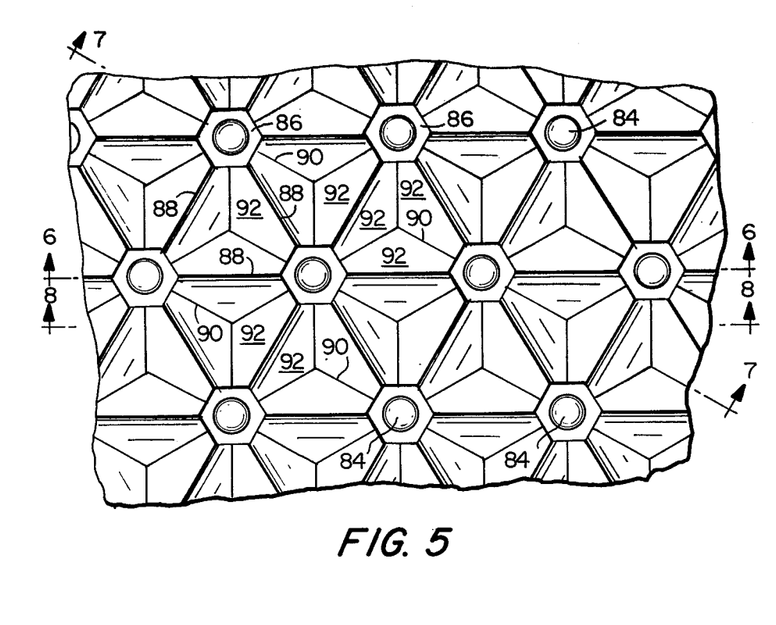
FIG. 5 is a partial plan view of an embodiment similar to that of FIG. 3.

Referring now to FIG. 25 of the drawings, the numeral 400 denotes a microfiche of the same general construction as that previously described with respect to, for example, FIG. 4 of the drawings. Numeral 412 denotes a thermoplastic substrate or base which may be of a polycarbonate and includes opaque, inter-lensette portions 414 between integral lenses denoted by the numeral 416. The lower surface of the microfiche is provided with a plurality of integral, downwardly extending nodules 422 which may be generally rectangular in plan cross-section, as well as in the illustrated elevational cross-section. The portions between downwarldy extending nodules 422 are denoted by the numeral 420 and may be regarded as recesses in the lower surface of the microfiche. The numeral 422 denotes photographic emulsion, the emulsion being applied only on the horizontal surfaces, none appearing on the vertically extending sides of the downwardly extending nodules 422. It will be noted that each lensette 416 corresponds to an is in optical registry with an emulsion portion 422, whether that emulsion portion is on one of the valleys 422 or one of the inverted top portions 422. In operation, an illumination sheet having an upper configuration complementary to the lower surface of microfiche 400 meshes with this lower surface, similar to the intermeshing of lensfiche 230 and downwardly extending positioning nodules 262 of the embodiment of FIG. 17. The lighting sheet is similar to that illustrated at FIG. 16 and is accordingly of the type illustrated in the noted Grunberger patent application. The reader will now be in a position to comprehend that, even though the lighting sheet is not illustrated at FIG. 25, that indexing of the microfiche 400 with the (not illustrated) lighting sheet results in a positive locking-in or alignment of the sources of illumination from the lighting sheet with each active lensette.

Referring now to FIG. 26 of the drawings, a similar embodiment is illustrated, except that here, the top of the microfiche is also configured for a locking purpose or function. The numeral 450 denotes generally a microfiche of the type shown, for example, at FIG. 4 of the drawings and includes a plurality of spaced, upstanding portions 452 and a plurality of relatively depressed portions 454. Each of these portions includes a lensette 456 and associated opaque portions 458. The opaque portions 458 correspond to the opaque portions 88 in, for example, the embodiment of FIG. 6 or the opaque portions 17 of the embodiment of FIG. 4. The numeral 462 denotes generally a lighting sheet of the type illustrated in the noted Grunberger application and also at FIG. 16 of the drawings of this application. The lighting sheet includes a main substrate portion 464 formed, as microfiche 450, of plastic such as polycarbonate. The top and bottom surfaces of the lighting sheet are coated with a transparent material having an index of refraction less than the index of refraction of the material of substrate 464 so that internal reflection is obtained. A typical reflecting surface of the lighting sheet is denoted by numeral 468 and is illustrated as in optical alignment with one of the lensettes 456 of the microfiche 450, this lensette being designated as 456 Active. While not illustrated, the lower surface of the viewing screen, such as viewing screen 210 of the embodiment of FIG. 16 is of a shape complementary to the upper surface of microfiche 450. From the above descriptions, the reader will now be in a position to comprehend the advantages of the embodiment of FIG. 26. With complementary (not illustrated) downwardly extending nodules positioned in the valleys between upstanding members 452, the microfiche is positively indexed or locked with respect to the viewing screen. The depressed portions 454 of microfiche 450 being positioned in the valleys between upstanding members 466 of the lighting sheet 462, the illumination sources defined by reflecting elements 468 of the lighting sheet are in optical alignment with the microimages of emulsion 460, in turn in alignment with the lensettes 456 and in turn with the (not illustrated) mask openings on the lower portion of the viewing screen. The mask openings are of course entirely similar to mask openings such as 218 of the embodiment of FIG. 16. Thus, after each indexing operation, as for example by moving lensfiche 450 with respect to both the lighting sheet and the viewing screen, proper optical alignment is enjoyed. As in the embodiment of FIG. 25, only the horizontal portions of the microfiche receive emulsion 460, the sloping sides are not coated.

The lower surface of microfiche (lensfiche) 400 of FIG. 25 may be termed as castellated, in the sense that the nodules 422 resemble merlons while the spaces or depressions 420 resemble crenels. While shown as square, the merlons may obviously be tapered, as in the manner of a truncated pyramids. similarly, both the upper and the lower surfaces of microfiche (lensfiche) 450 of FIG. 26 may also be termed castellated. The crenels of the lower surface coincide or are aligned with the merlons of the upper surface. The crenels and merlons of both embodiments extend over the entire microfiche (400 and 450) and are regularly arrayed in the manner of a checker board. Further, while the radii of curvature of the lensettes is usually the same, they may be of different curvature as indicated.

I claim:

1. A microfiche assembly, including a microfiche defined by a transparent sheet adapted to carry stored micro optical information over its area, one surface of said sheet including a plurality of lenses, the improvement comprising an alignment member having optical apertures therethrough and also carrying regularly arranged downwardly extending positioning nodules having valleys therebetween, the microfiche carrying a plurality of regularly arrayed upstanding positioning nodules positioned in the valleys between the said complementary regularly arrayed downwardly extending positioning nodules integral with said alignment member, the tips of said upstanding nodules defining said lenses, at least some of said lenses being optically aligned with the optical apertures of the alignment member, said optical apertures located in said valleys of said downwardly extending nodules whereby the two sets of positioning nodules align the microfiche with respect to the alignment member.

2. The assembly of claim 1, wherein said microfiche carries a photographic emulsion on the side of said sheet opposite the side which carries said lenses.

3. The assembly of claim 1, wherein said microfiche carries stored micro optical information on the surface opposite the side which carries said lenses, said micro optical information defined by a plurality of information sets, each information set corresponding to a unique macro scene, each information set occupying dispersed areas interlaced with but distinct from the dispersed areas occupied by any other information set, each unique macro scene corresponding to a unique set of said lenses, each of the dispersed areas of an information set having its own lens and being in optical correspondence therewith.

* * * * *